US007636029B1

(12) United States Patent
Zhou et al.

(10) Patent No.: US 7,636,029 B1
(45) Date of Patent: Dec. 22, 2009

(54) METHOD AND SYSTEM OF DISPLAY VALIDATION THROUGH VARYING VISUAL APPEARANCE

(75) Inventors: Tong Zhou, Overland Park, KS (US); Debashis Haldar, Olathe, KS (US); Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 337 days.

(21) Appl. No.: 11/335,491

(22) Filed: Jan. 19, 2006

(51) Int. Cl.
*G05B 19/00* (2006.01)

(52) U.S. Cl. ........................ 340/5.2; 340/5.21; 340/5.3; 340/691.6; 713/182

(58) Field of Classification Search ............ 340/815.56, 340/572.8, 571, 539.13, 691.6, 539.15, 5.2, 340/5.21, 5.3, 5.32; 235/380; 713/182, 186; 705/10
See application file for complete search history.

(56) References Cited

U.S. PATENT DOCUMENTS

| | | | | | |
|---|---|---|---|---|---|
| 5,364,132 | A | | 11/1994 | Haas et al. | 283/67 |
| 5,905,247 | A | | 5/1999 | Ilén | 235/384 |
| 5,960,085 | A | * | 9/1999 | de la Huerga | 340/5.61 |
| 5,979,773 | A | * | 11/1999 | Findley et al. | 235/492 |
| 6,778,066 | B2 | * | 8/2004 | Smith | 340/5.61 |
| 7,107,455 | B1 | * | 9/2006 | Merkin | 713/182 |
| 7,176,849 | B1 | * | 2/2007 | Mooney et al. | 345/2.3 |
| 2003/0146852 | A1 | | 8/2003 | O'Dell | 340/932.2 |
| 2005/0057373 | A1 | | 3/2005 | Noguchi | 340/932.2 |
| 2005/0063194 | A1 | | 3/2005 | Lys et al. | 362/545 |
| 2005/0134461 | A1 | | 6/2005 | Gelbman et al. | 340/572.8 |
| 2007/0158409 | A1 | * | 7/2007 | Haas | 235/380 |

FOREIGN PATENT DOCUMENTS

| | | |
|---|---|---|
| NZ | 516006 | 7/2003 |
| WO | WO93/20539 | 10/1993 |
| WO | WO97/19568 | 5/1997 |
| WO | WO98/04080 | 1/1998 |
| WO | WO99/10844 | 3/1999 |
| WO | WO99/48062 | 9/1999 |
| WO | WO03/067528 | 8/2003 |

* cited by examiner

*Primary Examiner*—Toan N Pham

(57) ABSTRACT

Users of the system are each provided with an indicator module capable of presenting a display. An authorization module keeps track of which users are authorized to access a facility, such as a secured area or a parking facility. The authorization module sends messages, such as SMS messages, to the authorized indicator modules directing them to present a common valid display. The common valid display changes repeatedly over time, but, at any one time, the modules of authorized users all present the same display. A user may be granted or denied access based on whether the display on his module is the same as that of known authorized modules.

7 Claims, 3 Drawing Sheets

METHOD AND SYSTEM OF DISPLAY VALIDATION THROUGH VARYING VISUAL APPEARANCE

BACKGROUND

The present invention relates to authorization, and, in particular, to a wirelessly-managed system for presenting a display of authorization status.

The use of displayed credentials, such as security badges or parking ticket stubs, is a common means of providing visual evidence of one's authorization. Today's reproduction technologies, such as color printers and photocopiers, together with readily-available image processing software, make it simple to counterfeit such credentials. Non-visual credentials that make use of radio signals and/or magnetic stripes can be used, but they require a substantial investment for on-site reading capability.

It would be desirable to provide a system in which displayed credentials are difficult to counterfeit, but that can be read visually by security personnel.

SUMMARY

Users of the system are each provided with an indicator module capable of presenting a visual display. An authorization module keeps track of which users are authorized to access a facility, such as a secured area or a parking facility. The authorization module sends messages, such as SMS messages, to the authorized indicator modules directing them to present a common valid display. The common valid display changes repeatedly over time, but, in general, the modules of authorized users present the same display at any one time. In this way, a user may be granted or denied access based on whether the display on his module is the same as that of known authorized modules.

DETAILED DESCRIPTION

I. Overview of One Embodiment

Figure 1:
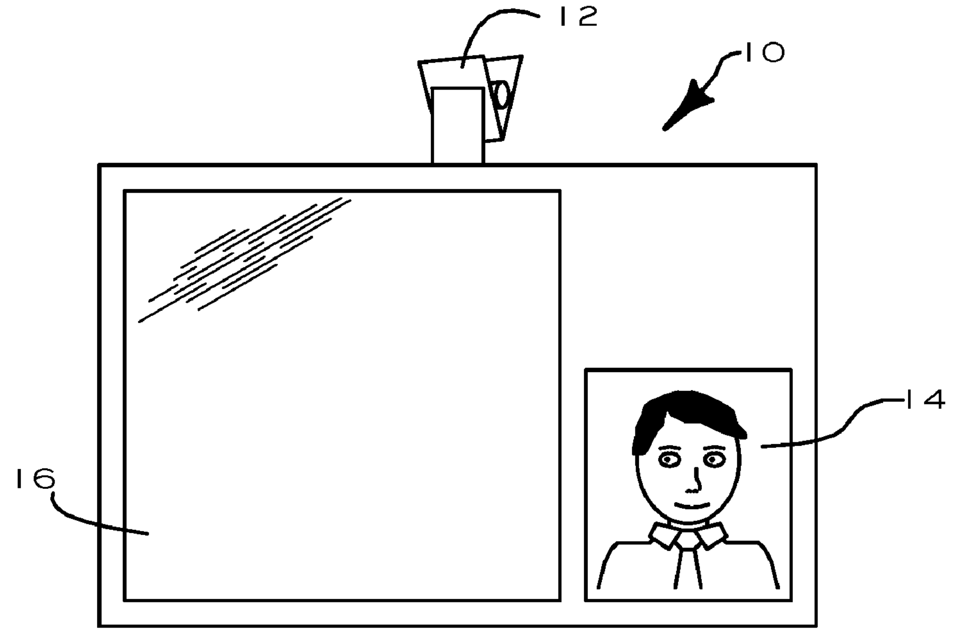
FIG. 1 is a front view of an indicator module implemented in a security badge.

An authorization system is provided that makes use of a central authorization module and one or more indicator modules. In an exemplary embodiment, the indicator modules are security badges that have the ability to present a plurality of different displays. To provide this ability, the badges are equipped with, for example, a color LCD (liquid crystal display).

Security personnel may determine whether or not a user is authorized to access a particular area by whether or not the user's badge is presenting a valid display. The display may be, for example, a particular background color on the badge, or it may be more complicated pattern of colors and/or shapes, images, and/or text. All valid badges will have a common display at any one time.

To prevent unauthorized (including formerly-authorized) users from gaining access, the valid display is changed from time to time. When the valid display is changed, the authorization module sends an indicator message to the badges of all authorized users, indicating what the new valid display is. As a result, the badges of all authorized users will present the new display, while those of unauthorized users, or users whose authorization has expired, will not.

A security guard responsible for checking users' badges may himself be provided with a badge or other module that receives the indicator messages and presents the currently-valid display. As a result, the guard can reference this module when a user seeks access, and compare the display on his own module to the display on the user's badge.

In this embodiment, the indicator messages are sent over a wireless telecommunications network, such as a CDMA (code division multiple access) network. In this way, badges can be updated even when they are not in the immediate vicinity of the authorization module. (Such badges could belong to, for example, employees who have not yet arrived at work. Their badges will be updated before they arrive.)

In a related embodiment, the indicator modules may be mounted on a car dashboard or windshield to indicate whether the car is authorized to enter or park in a particular area. In such an embodiment, the authorization module may be provided with the capability to accept payment for parking, either directly through a kiosk or indirectly over a network.

Because the authorization module and the indicator modules can communicate through a messaging system over a wireless telecommunications network, no special identification-reading equipment is required on-site. The functions of the authorization module can be performed at a separate facility and may even be outsourced to a security services provider.

II. An Authorization System

An exemplary authorization system makes use of an authorization module and a plurality of indicator modules. Each user of the system is provided with an indicator module. The authorization module identifies which users are currently authorized, and, to all of those authorized users, it sends a valid indicator message. The valid indicator message identifies what display is currently valid, and the indicator modules present the currently-valid display.

The indicator module may take one of several different forms depending on the type of authorization managed by the system. For example, where the authorization at issue is that of individuals seeking access to a secured area, the indicator module may have the general form of a badge, with a clip and/or a strap to facilitate attachment to a user's clothing or his person. Where the authorization at issue is authorization to park in a particular area, the indicator module may have a suction cup or an adhesive attachment to attach to a car's windshield or dashboard.

An exemplary indicator module is illustrated in FIG. 1. In FIG. 1, the indicator module 10 is a badge with a resilient clip 12 for attachment to a user's clothing. The badge displays a picture 14 of the user and includes display hardware 16, such as an LCD screen. The picture 14 may be a printed photograph or may itself be displayed on the display hardware. As an alternative to the clip 12, a strap or other feature may be used to attach the badge to the user's person.

Figure 2:
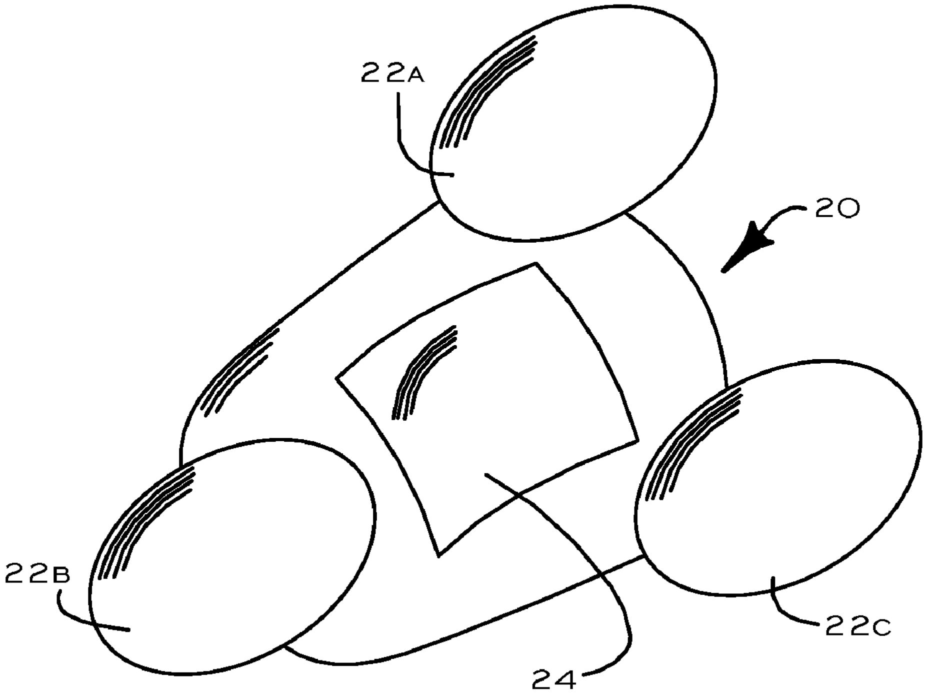
FIG. 2 is a perspective view of an indicator module implemented as an automobile parking module.

Another exemplary indicator module is illustrated in FIG. 2. In FIG. 2, the indicator module 20 is a parking module equipped with suction cup attachments 22*a-c* to attach the module to the inside of an automobile windshield. The module 20 further includes display hardware 24, such as an LCD screen. The display hardware 24 is preferably oriented on the same side of the module as the suction cups, so that it is visible from outside the windshield to which it is attached. As an alternative to suction cups, the module may be provided with, for example, an adhesive mount, or the module may simply rest on the automobile dashboard.

One of the indicator modules may be a benchmark indicator module that presents the currently valid display for verification purposes. The display hardware of a benchmark indicator module may be, for example, a computer monitor. The benchmark indicator module may be prominently positioned so that all persons in an area (such as a secured facility) can see the currently-valid display. As an alternative, the benchmark indicator may be positioned in, for example, a guard station for reference by security personnel only.

Figure 3:
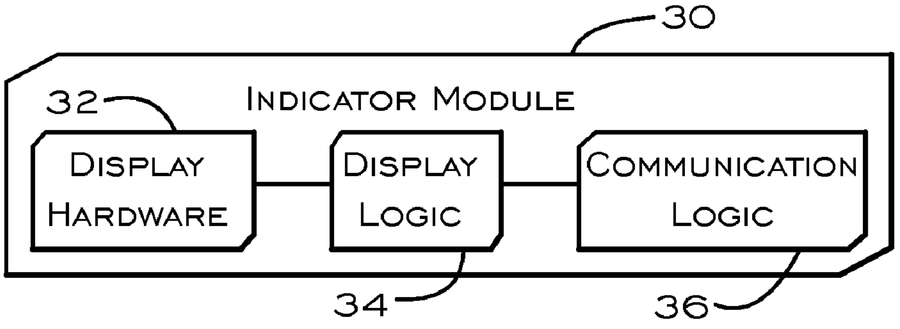
FIG. 3 schematically illustrates the logical architecture of an indicator module.

As illustrated in FIG. 3, an indicator module 30 is provided with display hardware 32. The display hardware of the indicator module enables the module to present the valid display. The display hardware may be, for example, a color or monochrome LCD or one or more LEDs (light emitting diodes). The indicator module further includes communication logic 36 for managing communications with the authorization module and display logic 34, for operating the display hardware to present the display as directed in the indicator message. The display logic may access a locally-stored repository of displays, and/or it may have the capability to generate new displays based on information received through the communication logic 36.

Figure 4:
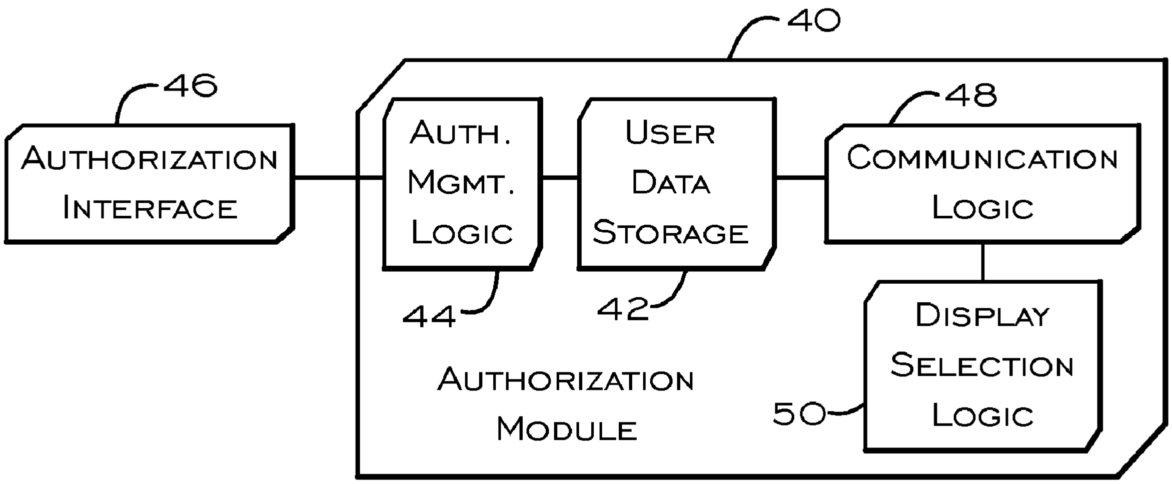
FIG. 4 schematically illustrates the logical architecture of an authorization module.

As illustrated in FIG. 4, the authorization module 40 is provided with user data storage 42. In one embodiment, the user data storage is a database with an entry for each user. Each entry may include a flag that indicates whether the corresponding user is presently authorized. For example, if the flag is set, it may indicate that the user is authorized to enter a particular secured facility or to park a car in a particular area, whereas if the flag is cleared, the user does not have such authorization. The entries in the user data storage may include additional information such as an address (e.g. an IP, SMS, or SIP address) of the user's indicator module, the date and/or time at which the user became authorized, and the date and/or time at which the authorization will expire.

The authorization management logic 44 determines which users are authorized and is responsible for keeping the information in the user data storage up to date. For example, when a user's authorization expires, the authorization management logic is responsible for clearing any flag in the user data storage that indicates the user is authorized.

The authorization management logic may interface with an authorization interface 46. The authorization interface receives input that allows the authorization management logic to maintain the information in the user data storage. For example, the authorization interface may operate a Web page or other computer network interface that allows an organization's personnel or security department to designate users who are authorized to access a particular secured area. As an alternative, the authorization interface may be a kiosk at which individuals wishing to pay for parking can identify themselves and pay for authorization to park in a particular area.

Based on the information stored in the user data storage, communication logic 48 in the authorization module operates to send a valid indicator message to authorized users' respective indicator modules. The indicator message provides information on what the indicator module should display in order to be accepted as valid. For example, the indicator message may direct indicator modules of authorized users to display a blue background. The indicator message may simply identify a display that is already stored by the indicator modules, or they may include information, such as a bitmap or other image data (in, for example, JPEG, GIF, TIFF, or other formats) to enable the indicator module to generate the display. Where the valid display includes the display of a security code, such as a key word or a number, the indicator message may include the text of the security code, or other information on how to generate the security code. The indicator message may be sent in an encrypted format.

The communication logic may send the indicator messages using one or more of several techniques, such as messages in SMS, SIP, HTTP, UDP, or other messaging formats. Such messages may be sent over a wireless network including, but not limited to, a CDMA or WiMAX network.

For users whose authorization has expired or who are otherwise not authorized, the communication logic may send no indicator message at all, or it may send a null indicator message. The null indicator message may instruct an indicator module to display nothing at all, or it may direct the indicator module to display an invalid indicator. The invalid indicator may be, for example, a red background. (In other embodiments, a red background may, like other colors or patterns, be used as a valid indicator.) The invalid indicator may be the same as—or at least bear a plausible resemblance to—displays that in the past were valid indicators. In this way, the user is not immediately alerted to the fact that his indicator module display is invalid.

To keep valid indicator modules in synchrony, an indicator message may be sent to each module before the modules are to change their displays. In such a case, the indicator message may include information indicating the time at which the modules are to change displays and/or the time remaining before the modules are to change their displays.

The communication logic may send indicator messages to users' indicator modules on a periodic basis (every six minutes, hourly, daily, or weekly, for example), or an aperiodic basis. The timing of the indicator messages may be randomized to some degree, so that users are left unaware of exactly when an update will take place. (This discourages a user who is aware that his authorization has expired from purposefully clearing all checkpoints just before the update.) The randomization may call for, for example, updates at random intervals but in no event greater than two hours. In another example, updates may be approximately hourly but occur randomly within a window of time on either side of the hour.

The authorization module is further provided with display selection logic 50. This logic is responsible for determining which display is considered valid. The valid display may be selected randomly or pseudo-randomly from a database of available displays. The displays available may be limited by the display capabilities of the indicator modules. For example, where the indicator modules are provided with a color LCD display, a wide variety of readily-identifiable colors and patterns may be selected (e.g. solid colors, polka-dots, stripes, geometric patterns, or images such as seasonally-appropriate holiday or sports-related images). Where the display capabilities of the indicator module are more limited, the display may be selected from a set of solid colors able to be displayed by the indicator modules. As an alternative, or in addition to a database of displays, the display selection logic may be capable of generating a new display.

The display selection logic may choose the valid display randomly, or it may select from available displays in a preselected order. As an alternative, the display selection may be partially randomized, so that the next selected display is, for example, not one of the previous ten displays, or is especially distinct from the previous display. (E.g., switching from a red display to an orange display could make it more difficult to distinguish newly-unauthorized users, as opposed to switching from red to blue.)

III. An Authorization Method

Figure 5:
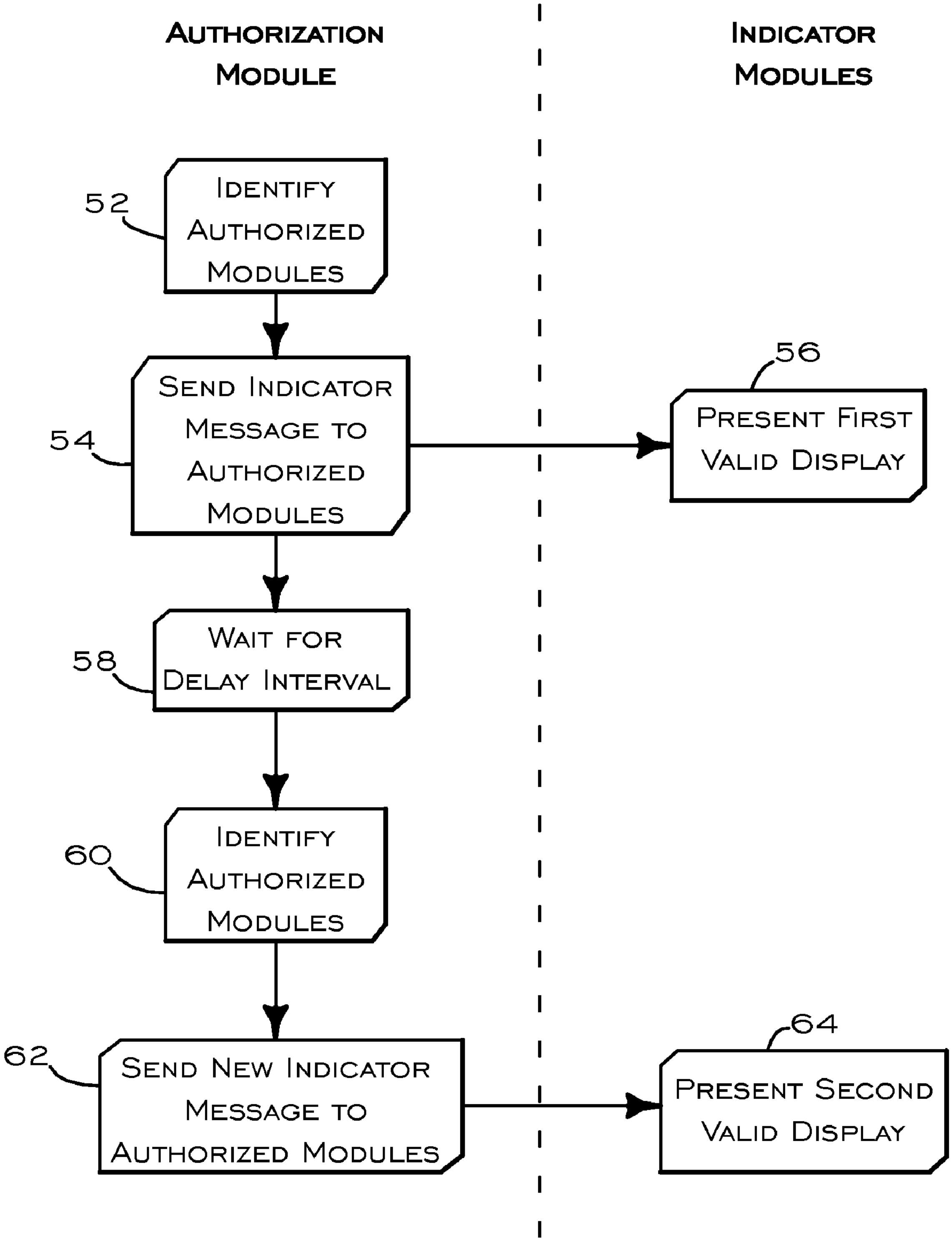
FIG. 5 is a flow diagram illustrating one method of using an authorization module and indicator modules.

In one exemplary embodiment, as illustrated in FIG. 5, an authorization method makes use of an authorization module and a plurality of indicator modules.

The authorization module determines which modules out of the plurality of indicator modules are authorized (step 52). The authorization module then sends to each of the plurality of authorized indicator modules an indicator message (step 54). The indicator message identifies a first valid display for the indicator modules to present, and the indicator modules present the first valid display (step 56).

After a delay interval passes (step 58), the authorization module again determines which of the plurality of indicator modules are authorized (step 60). The authorization module again sends indicator messages to the authorized modules identifying a second valid display (step 62). The indicator modules then present the second valid display (step 64), which is visually distinguishable from the first valid display.

The delay interval may be fixed in advance or chosen randomly or pseudo-randomly. For example, it may be every few minutes, hourly or daily. Preferably, the delay interval is at least one minute. The delay interval may be the time that passes between consecutive attempts by the authorization module to identify authorized indicator modules. In embodiments in which the indicator message includes a refresh time at which indicator modules are to present the new display, the delay interval may be measured by the period between consecutive refresh times. Alternatively, where indicator modules present the new display as soon as they receive a new indicator message, the delay interval may be measured between consecutive times at which the indicator messages are sent. Other techniques of measuring the delay interval may also be used, but the interval generally relates to the time between the change in valid displays, and the interval may be variable on a random or pseudorandom basis.

The process of checking which modules are authorized, and updating the display of those modules, is repeated on an ongoing basis, so that, although their display changes, (and the set of authorized modules itself may change), the authorized modules generally present the same display at the same time. Although the system aspires to keep the displays of all authorized modules in precise synchrony, it is to be understood that the synchrony may be imperfect due to processing and/or messaging delays.

In an optional feature, the authorization module periodically determines which indicator modules are not currently authorized and send a null indicator message to such modules. The null indicator message my direct those modules to present an invalid display or to present no display at all.

In a system in which the all those in possession of a compatible indicator module are considered authorized, the authorization module need not perform the separate step of identifying which indicator modules are authorized, and may instead send a valid indicator message to all indicator modules.

In one embodiment, the authorization module may identify one or more subscribers whose authorization will not be in question over the course of several display-change periods. In one example, displays may change every five minutes, but one or more subscribers may have pre-paid for two hours of parking. In such an embodiment, the authorization module need not re-check the status of these subscribers every five minutes, but instead may continue to provide indicator messages over the course of those two hours. The processing demands on the authorization module may be reduced by checking the authorization status of the subscribers only when it is in question. For example, the authorization module may check the status of a subscriber only at the end of a pre-paid period, for example, to determine whether the subscriber has paid for an additional period.

Other alternatives may be implemented when the authorization module does not check the authorization status of a subscriber in each display-change period. The authorization module may, for example, select a series of visual displays in advance. An indicator message identifying this series of visual displays may be sent to the subscriber's display module. For example, if a subscriber pre-pays for two hours of parking, the authorization module may send to the subscriber's display module an indicator message identifying the next two hours worth of valid visual displays.

Although references to preferred embodiments have been used as a means of illustrating the invention, the invention should not be understood as being limited only to those embodiments.

The invention claimed is:

1. A method comprising:

providing a plurality of users with indicator modules capable of presenting a visual display, wherein at least two of the users are authorized users;

causing the indicator modules of the authorized users to present a common authorized display; and at repeated intervals, causing the indicator modules of the authorized users to present a different common authorized display.

2. The method of claim 1, further comprising:

comparing the display on a first indicator module with the display on a second indicator module; and providing a user with access to a facility only if the two displays are the same.

3. A system comprising:

a plurality of indicator modules, each indicator module being operative to present a visual display; and an authorization module operative to identify authorized indicator modules and to send, at repeated intervals, indicator messages to the authorized indicator modules, wherein the indicator messages identify a common visual display and a time at which the indicator modules are to change displays;

wherein the indicator modules are operative, in response to receiving the indicator messages, to synchronously present the common visual display at the time identified in the indicator messages.

4. The system of claim 3, wherein the indicator modules are in the form of security badges.

5. The system of claim 3, wherein the indicator modules are in the form of parking modules.

6. The system of claim 3, wherein each indicator module includes display hardware for presenting a display;

communication logic for receiving indicator messages; and display logic responsive to a received indicator message and operative to direct the display hardware to present the visual display identified in the received indicator message.

7. The system of claim 3, wherein the authorization module includes:

user data storage indicating, for each module, whether the module is authorized;

display selection logic operative to select the common visual display; and communications logic operative to identify the authorized modules and to send the indicator messages to the authorized modules.

* * * * *

UNITED STATES PATENT AND TRADEMARK OFFICE

CERTIFICATE OF CORRECTION

PATENT NO. : 7,636,029 B1
APPLICATION NO. : 11/335491
DATED : December 22, 2009
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this

Ninth Day of November, 2010

David J. Kappos
*Director of the United States Patent and Trademark Office*